(12) United States Patent
Lu et al.

(10) Patent No.: US 11,242,943 B2
(45) Date of Patent: Feb. 8, 2022

(54) MICRO-VALVE

(71) Applicant: Shimadzu Corporation, Kyoto (JP)

(72) Inventors: Wenjian Lu, Kyoto (JP); Shigeaki Shibamoto, Kyoto (JP); Kazunori Takahashi, Kyoto (JP); Ayaka Sato, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 16/925,007

(22) Filed: Jul. 9, 2020

(65) Prior Publication Data

US 2021/0088155 A1    Mar. 25, 2021

(30) Foreign Application Priority Data

Sep. 24, 2019  (JP) .............................. JP2019-172701

(51) Int. Cl.
*F16K 7/17*        (2006.01)
*F16K 99/00*    (2006.01)

(52) U.S. Cl.
CPC ...... *F16K 99/0015* (2013.01); *F16K 99/0034* (2013.01); *F16K 2099/0074* (2013.01); *F16K 2099/0094* (2013.01)

(58) Field of Classification Search
CPC ............. F16K 99/0015; F16K 99/0034; F16K 2099/0074; F16K 2099/0094
USPC ........................... 251/331; 137/827, 828, 833
See application file for complete search history.

(56) References Cited

U.S. PATENT DOCUMENTS

| 4,826,131 | A | * | 5/1989 | Mikkor | F02M 61/1853 |
| | | | | | 239/585.3 |
| 4,875,500 | A | * | 10/1989 | Ariizumi | F15B 13/0405 |
| | | | | | 137/596.18 |
| 5,216,273 | A | * | 6/1993 | Doering | F15C 5/00 |
| | | | | | 251/129.01 |
| 5,238,223 | A | * | 8/1993 | Mettner | F15C 5/00 |
| | | | | | 251/129.06 |
| 5,271,724 | A | * | 12/1993 | van Lintel | F16K 99/0005 |
| | | | | | 417/413.2 |
| 5,325,880 | A | * | 7/1994 | Johnson | F15C 3/04 |
| | | | | | 137/1 |

(Continued)

FOREIGN PATENT DOCUMENTS

WO    2018/235229 A1    12/2018

*Primary Examiner* — Minh Q Le
(74) *Attorney, Agent, or Firm* — Muir Patent Law, PLLC (57) ABSTRACT

Provided is a micro-valve having a laminate structure capable of improving sealing performance when a foreign substance is mixed. The micro-valve 10 has a laminate structure and includes a base layer 20 and a diaphragm layer 30. The base layer is formed with an inlet port 23 for introducing a gas into the micro-valve and an outlet port for allowing the gas to flow outside. The diaphragm layer is arranged to face the base layer. The diaphragm layer switches the flowing and blocking of the gas from the inlet port to the outlet port by elastic deformation thereof. The diaphragm layer has a configuration in which a plurality of deformation regions 33 and a plurality of rigid body regions 34 are alternately formed, the deformation region being elastically deformable in accordance with an inflow of a pneumatic fluid into the micro-valve. The diaphragm layer closes at least one of the inlet port and the outlet port by elastic deformation of at least a part of the plurality of deformation regions.

10 Claims, 5 Drawing Sheets

(56) References Cited

U.S. PATENT DOCUMENTS

| | | | | |
|---|---|---|---|---|
| 5,780,748 | A * | 7/1998 | Barth | F15C 5/00 137/98 |
| 6,142,444 | A * | 11/2000 | Kluge | F15C 3/04 137/831 |
| 6,182,941 | B1 * | 2/2001 | Scheurenbrand | F15C 5/00 137/554 |
| 6,382,588 | B1 * | 5/2002 | Hierold | F15C 5/00 251/129.04 |
| 6,390,791 | B1 * | 5/2002 | Maillefer | F04B 53/1067 417/413.3 |
| 6,685,444 | B2 * | 2/2004 | Ogawa | F04B 13/00 417/413.1 |
| 7,011,288 | B1 * | 3/2006 | Slicker | F15C 5/00 251/11 |
| 7,025,324 | B1 * | 4/2006 | Slocum | B01L 3/502738 251/11 |
| 7,192,001 | B2 * | 3/2007 | Wise | F15C 5/00 251/11 |
| 7,607,641 | B1 * | 10/2009 | Yuan | F16K 7/126 137/597 |
| 8,152,136 | B2 * | 4/2012 | Cheng | F16K 99/0009 251/129.06 |
| 10,478,818 | B1 * | 11/2019 | Ball | F16K 99/0005 |
| 2019/0219194 | A1 * | 7/2019 | Lu | F16K 99/0015 |
| 2019/0353157 | A1 * | 11/2019 | Mou | F16K 99/0057 |

* cited by examiner

MICRO-VALVE

CROSS-REFERENCE TO RELATED APPLICATIONS

This application claims priority under 35 U.S.C. § 119 to Japanese Patent Application No. 2019-172701 filed on Sep. 24, 2019, the entire disclosure of which is incorporated herein by reference in its entirety.

TECHNICAL FIELD

The present invention relates to a micro-valve, and more particularly to a structure for improving sealing performance of a micro-valve having a laminate structure.

BACKGROUND OF THE INVENTION

As a valve device for switching a flow path which can be used for an analyzer such as a gas chromatograph, a micro-valve for switching between flowing and blocking of a fluid by using an elastically deformable diaphragm is known.

International Publication No. WO 2018/235229 (Patent Document 1) discloses a micro-valve of a laminate structure having a diaphragm layer in which a deformation portion is formed around a moving portion. In the micro-valve of International Publication No. WO 2018/235229 (Patent Document 1), a moving portion can be used to close the inlet port and/or the outlet port through which a sample gas passes by flowing a control fluid (hereinafter also referred to as "pneumatic fluid") of the valve to elastically deform the deformation portion of the diaphragm layer.

PRIOR ART DOCUMENT

Patent Document

Patent Document 1: International Publication No. WO2018/235229

SUMMARY OF THE INVENTION

Problems to be Solved by the Invention

In the micro-valve configuration of International Publication No. 2018/235229 (Patent Document 1), the deformation portion is formed by partially thinning the thickness of the material (e.g., silicon) forming the diaphragm layer. In other words, the moving portion of the diaphragm layer is made thicker than the deformation portion, so that the entire moving portion moves as a rigid body as the deformation portion elastically deforms.

In the micro-valve having such a configuration, when a foreign substance is mixed in the sealing surface between the base layer where the inlet port/outlet port of the sample gas is formed and the moving portion of the diaphragm layer, even if a pneumatic fluid flows in to block the sample gas, a gap is generated between the base layer and the moving portion by the foreign substance, and the sealing performance may be lost. As a result, the sample gas leaks from the inlet port to the outlet port, so that the flow path cannot be properly switched.

The present invention has been made to solve the above-mentioned problems, and an object thereof is to improve sealing performance when a foreign substance is mixed in a micro-valve having a laminate structure.

Means for Solving the Problem

A micro-valve according to the first aspect of the present invention has a laminate structure and is provided with a base layer and a diaphragm layer. The base layer is formed with an inlet port for introducing a gas into the micro-valve and an outlet port for allowing the gas introduced from the inlet port to flow outside. The diaphragm layer is arranged to face the base layer. The diaphragm layer switches flowing and blocking of a gas from the inlet port to the outlet port by elastic deformation thereof. The diaphragm layer has a configuration in which a plurality of deformation regions and a plurality of rigid body regions are alternately arranged, the deformation region being elastically deformable as a pneumatic fluid flows into the micro-valve. The diaphragm layer closes at least one of the inlet port and the outlet port by elastic deformation of at least a part of the plurality of deformation regions.

A micro-valve according to the second aspect of the present invention has a laminate structure and is provided with a base layer and a diaphragm layer. The base layer is formed with an inlet port for introducing a gas into the micro-valve and an outlet port for allowing the gas introduced from the inlet port to flow outside. The diaphragm layer is arranged to face the base layer. The diaphragm layer switches flowing and blocking of the gas from the inlet port to the outlet port by elastic deformation of the diaphragm. The diaphragm layer includes a deformation region configured to be elastically deformed as a pneumatic fluid flows into the micro-valve and a rigid body region that limits a deformation amount of the deformation region. At least one of the inlet port and the outlet port is closed by being covered by the elastically deformed deformation region.

Effects of the Invention

According to the micro-valve of this disclosure, it has a configuration in which the diaphragm layer is formed of a plurality of deformation regions and a plurality of rigid body regions, or a configuration in which at least one of the inlet port and the outlet port is covered with the deformation region when the deformation region is elastically deformed. As a result, the flexibility of the diaphragm layer is increased, so that at least one of the inlet port and the outlet port can be closed even when a foreign substance is mixed into the sealing surface. Therefore, in the micro-valve, it is possible to improve the sealing performance when a foreign substance is mixed.

EMBODIMENTS FOR CARRYING OUT THE INVENTION

Hereinafter, some embodiments of the present disclosure will be described in detail with reference to the attached drawings. In the drawings, the same or corresponding portions are denoted by the same reference numerals, and the description thereof will not be repeated.

Embodiment (Configuration of Micro-Valve)

Figure 1:
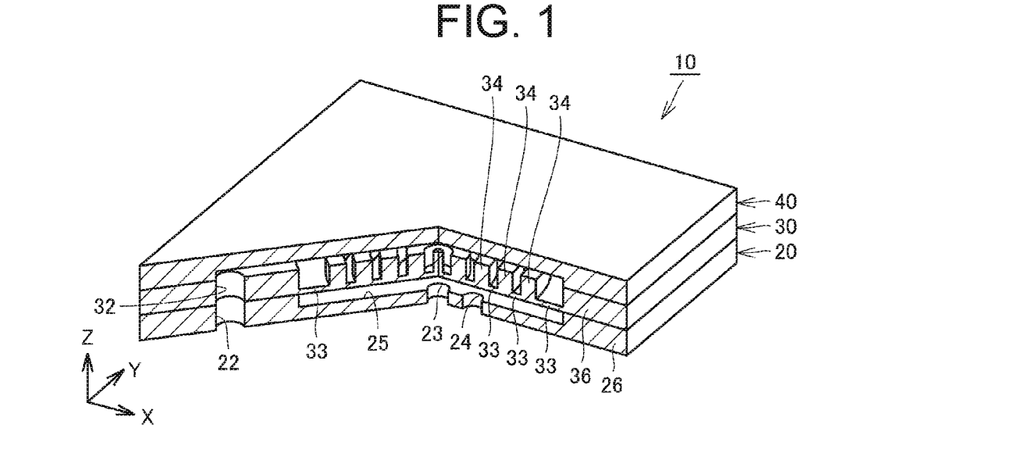
FIG. 1 is a perspective view showing a micro-valve according to an embodiment of the present invention.
Figure 2:
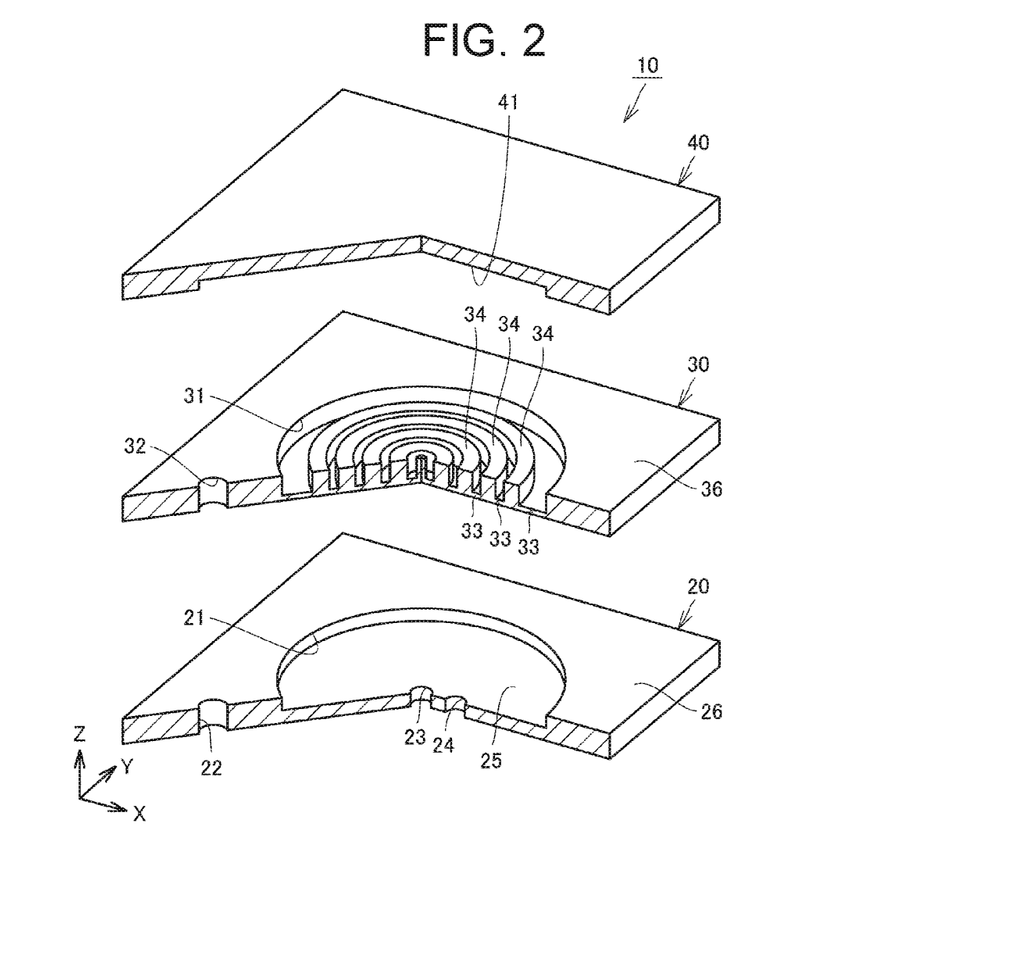
FIG. 2 is an exploded perspective view of the micro-valve shown in FIG. 1.
Figure 3:
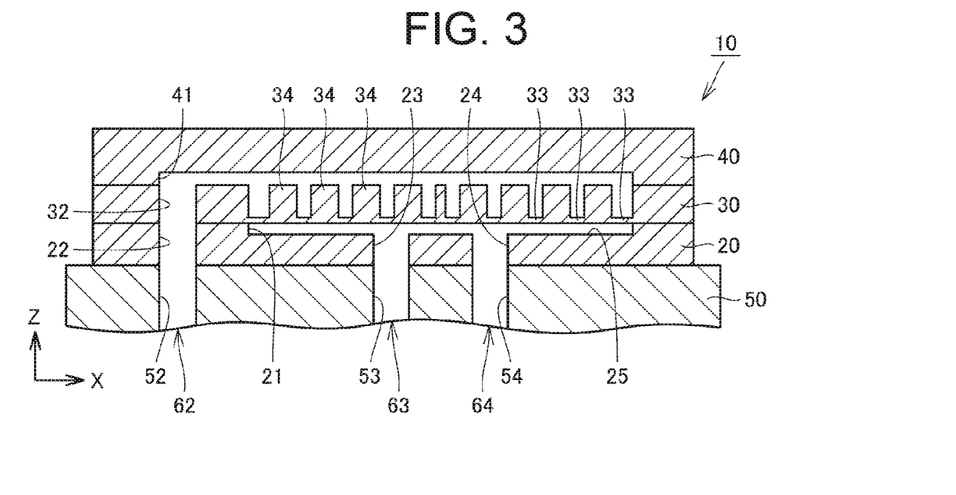
FIG. 3 is a side surface perspective view of the micro-valve shown in FIG. 1.
Figure 4:
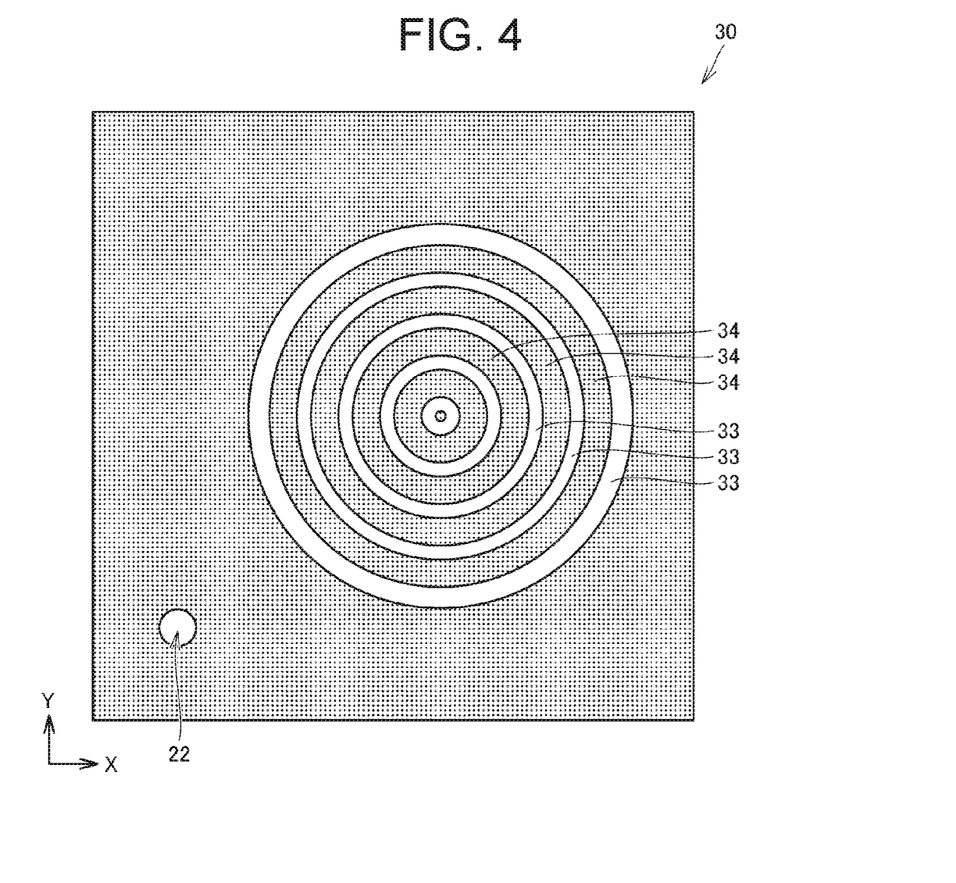
FIG. 4 is a plan view of a diaphragm layer shown in FIG. 1.

The configuration of a micro-valve 10 according to an embodiment will be described with reference to FIG. 1 to FIG. 4. FIG. 1 is a perspective view of the micro-valve 10 and FIG. 2 is an exploded perspective view of the micro-valve shown in FIG. 1. In FIG. 1 and FIG. 2, a state is shown in which a part of the micro-valve 10 is cut away. FIG. 3 is a cross-sectional view of the micro-valve 10, and FIG. 4 is a plan view of a diaphragm layer 30.

Referring to FIG. 1 to FIG. 4, the micro-valve 10 has a laminate structure in which a plurality of plate-like members are stacked, each of the plate-like members having a substantially square outer shape in a plan view when viewed in the normal direction. In the following descriptions, the lamination direction of the micro-valve 10 (i.e., the normal direction) is denoted as a Z-axis direction, and the directions of the adjacent sides of the square planar shapes are denoted as an X-axis direction and a Y-axis direction, respectively. For example, the dimension (thickness) of the micro-valve 10 in the Z-direction is about 1 mm to 2 mm, and the dimension in the X-direction and the dimension in the Y-direction each are about 1 cm. For convenience, the positive direction of the Z-axis in the drawing is also referred to as an upward direction, and the negative direction thereof is also referred to as a downward direction.

The micro-valve 10 includes, as a plurality of plate-like members, a base layer 20, a diaphragm layer 30, and a cover layer 40. Each of the base layer 20, the diaphragm layer 30, and the cover layer 40 has substantially the same external shape when viewed in plan. The base layer 20, the diaphragm layer 30, and the cover layer 40 are each formed of a single material of, for example, silicon, glass, iron (stainless steel, carbon steel), titanium, brass, or PEEK (Poly Ether Ether Ketone) resin, and are microfabricated by a MEMS (Micro Electric Mechanical Systems) technique to achieve the desired strength and flexibility.

The base layer 20 is placed as the bottom layer of the micro-valve 10. In the base layer 20, a recess 21 and openings 22 to 24 penetrating the base layer 20 are formed. The recess 21 has a substantially circular shape when the base layer 20 is viewed in plan, and is formed in the vicinity of the substantially center of the base layer 20. The recess 21 is recessed from the upper surface side to the lower surface side of the base layer 20. The thickness of the base layer 20 is about 150 μm. The depth of the recess 21 is 5 μm to 20 μm, preferably about 10 μm.

The openings 23 and 24 are formed in the bottom 25 of the recess 21. As will be described later, the openings 23 and 24 form an inlet port and an outlet port for a sample gas, respectively. The opening 22 is formed in the peripheral outer edge portion 26 of the recess 21 of the base layer 20 so as to be spaced apart from the recess 21. As will be described later, the opening 22 forms a supply port of the control fluid (pneumatic fluid) of the micro-valve 10.

The diaphragm layer 30 is arranged on the upper surface side of the base layer 20 to face the base layer 20. As shown in FIG. 4, a plurality of concentrically formed annular recesses 31 and an opening 32 penetrating the diaphragm layer 30 are formed in the diaphragm layer 30. The annular recesses 31 are recessed from the upper surface side to the lower surface side of the diaphragm layer 30. The thickness of the bottom 33 of the annular recess 31 is smaller than the thickness of the portion 34 between the annular recesses 31, and the bottom 33 is flexible. The elastic deformation of the bottom of the annular recess 31 causes the portion 34 between the annular recesses 31 to move up and down. The outer shape of the outermost annular recess 31 is approximately the same as the recess 21 formed in the base layer 20. Hereinafter, the bottom 33 of the annular recess 31 is also referred to as a "deformation region 33" and the portion 34 between the annular recesses 31 is also referred to as a "rigid body region 34". As shown in FIG. 4, in this embodiment, the annular recess 31 has an annular shape, and the deformation region 33 and the rigid body region 34 are alternately arranged concentrically. Note that the moving portion is formed by the "deformation regions 33" and the "rigid body regions 34."

The opening 32 is formed in the outer edge portion 36 around the annular recess 31 of the diaphragm layer 30 so as to be spaced apart from the annular recess 31. The opening 32 is formed at a position overlapping with the opening 22 of the base layer 20 when viewed from above, and forms a supply port of a pneumatic fluid together with the opening 22.

The cover layer 40 is arranged on the upper surface side of the diaphragm layer 30 so as to face the diaphragm layer 30. That is, the diaphragm layer 30 is arranged between the base layer 20 and the cover layer 40.

The cover layer 40 is formed with a recess 41. The recess 41 is recessed from the lower surface side to the upper surface side of the cover layer 40. The recess 41 is formed to cover the opening 32 and the annular recesses 31 of the diaphragm layer 30. Thus, a pneumatic fluid supplied via the openings 22 and 32 is filled into the annular recesses 31 via the recess 41.

The opening and the recess in each layer are previously formed in each layer by, for example, dry etching or blasting. Thereafter, each layer is subjected to a deactivation treatment, and is laminated to form the micro-valve 10.

The micro-valve 10 is used by being connected to a flow path member 50 as shown in FIG. 3. In the flow path member 50, openings 52 to 54 are formed at positions corresponding to the openings 22 to 24 of the base layer 20, respectively. The opening 52 of the flow path member 50, the opening 22 of the base layer 20, and the opening 32 of the diaphragm layer 30 are in communication with each other, and form a supply port 62 of a pneumatic fluid. A pneumatic fluid is supplied through the supply port 62 to the recess 41 of the cover layer 40.

The opening 53 of the flow path member 50 is in communication with the opening 23 of the base layer 20, and forms an inlet port 63 for a sample gas. The opening 54 of the flow path member 50 is also in communication with the opening 24 of the base layer 20 and forms an outlet port 64 for a sample gas.

(Operation of Micro-Valve)

Figure 5:
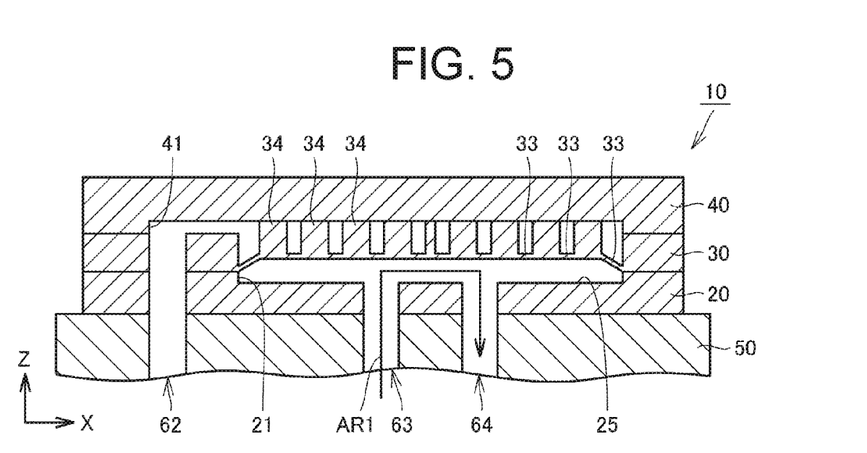
FIG. 5 is a first diagram for explaining the operation of the micro-valve shown in FIG. 1.

Next, the operation of the micro-valve 10 will be described with reference to FIG. 5 and FIG. 6. Referring to FIG. 3 and FIG. 5, in a state (initial state) in which neither a pneumatic fluid nor a sample gas is supplied to the micro-valve 10, as shown in FIG. 3, the deformation regions 33 and the rigid body regions 34 of the diaphragm layer 30 are spaced apart from the base layer 20 and the cover layer 40.

In the initial state, when the sample gas is supplied to the inlet port 63, the outermost deformation region 33 is elastically deformed by the differential pressure between the pressure in the space between the diaphragm layer 30 and the base layer 20 and the pressure in the space between the diaphragm layer 30 and the cover layer 40, so that the rigid body regions 34 and other deformation regions 33 are displaced upward. With this, as shown by the arrow AR1 in FIG. 5, the communication state between the inlet port 63 and the outlet port 64 is maintained, so that a sample gas introduced from the inlet port 63 flows out through the outlet port 64. That is, the micro-valve 10 becomes in an open state.

At this time, the deformation amount of the deformation regions 33 is restricted since the upper surface side of the rigid body region 34 comes into contact with the recess 41 of the cover layer 40. That is, the rigid body region 34 act as a stopper. Since the deformation amount of the deformation region 33 is restricted by the rigid body regions 34, the breakage of the deformation region 33 due to excessive deformation can be prevented.

Note that in the above-described description of FIG. 5, the case where no pneumatic fluid is supplied is described, but when the supply pressure of the sample gas is greater than the supply pressure of the pneumatic fluid, even in cases where a pneumatic fluid is being supplied, the state may be the same as the state of FIG. 5.

Figure 6:
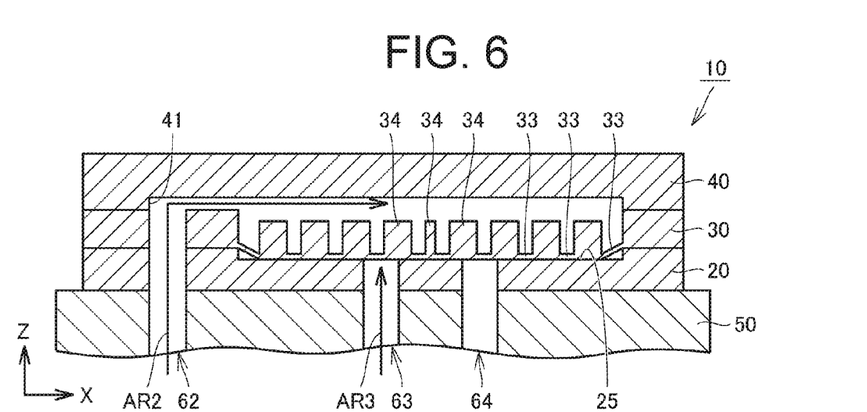
FIG. 6 is a second diagram for explaining the operation of the micro-valve shown in FIG. 1.

On the other hand, as indicated by the arrow AR2 in FIG. 6, when a pneumatic fluid having a pressure higher than the supply pressure of the sample gas is supplied to the supply port 62, the outermost deformation region 33 is elastically deformed by the differential pressure between the pneumatic fluid and the sample gas, so that the rigid body regions 34 and other deformation regions 33 are displaced downward. The lower surfaces of the rigid body regions 34 and the deformation regions 33 come into close contact with the bottom 25 of the recess 21 of the base layer 20, so that at least one of the inlet port 63 and the outlet port 64 of the sample gas is closed. As a result, the flow path of the sample gas supplied to the inlet port 63 is blocked (see the arrow AR3). That is, the micro-valve 10 becomes in a closed state.

From the state of FIG. 6, when the supplying of the pneumatic fluid is stopped or when the supply pressure of the pneumatic fluid is set to be lower than the supply pressure of the sample gas, the micro-valve 10 returns to the state of FIG. 5 and becomes in an open state.

In such a micro-valve in which a diaphragm layer is elastically deformed by using a pressure of a pneumatic fluid to switch flowing and blocking of a fluid as described above, the gap between the base layer and the diaphragm layer in the recess of the base layer is about 5 μm to 20 μm. Therefore, even in cases where a very small foreign substance is mixed in the fluid, the sealing performance of the micro-valve may be affected. Hereinafter, the operation of the micro-valve of this embodiment when a foreign substance is mixed between the base layer and the diaphragm layer will be described while comparing it with a comparative example.

Figure 7:
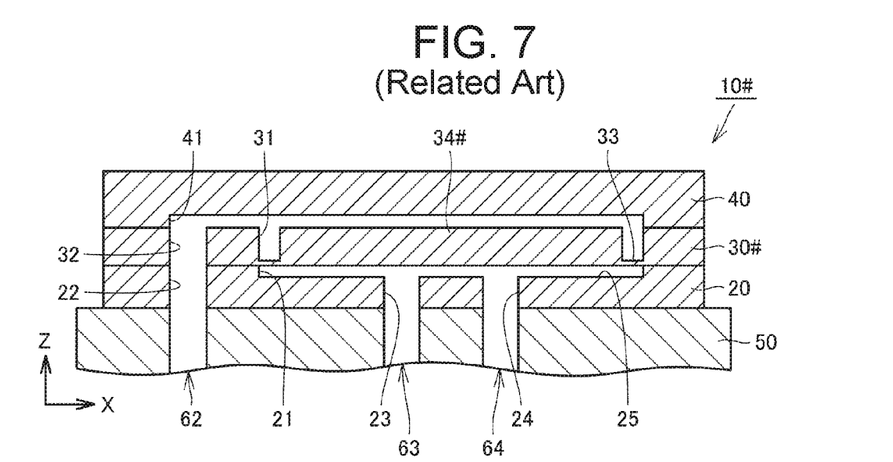
FIG. 7 is a side surface perspective view of a micro-valve of a comparative example.

FIG. 7 is a side perspective view of a micro-valve 10# according to a comparative example disclosed in the International Publication No. WO 2018/235229 (Patent Document 1). Only one annular recess 31 (i.e., deformation region 33) is formed in the diaphragm layer 30# of the micro-valve 10#, and the entire inner side of the annular recess 31 is a rigid body region 34#. When a pneumatic fluid is supplied to the supply port 62, the lower surface of the rigid body region 34# comes into close contact with the bottom 25 of the recess 21 formed in the base layer 20, thereby blocking the sample gas flow path.

Figure 8:
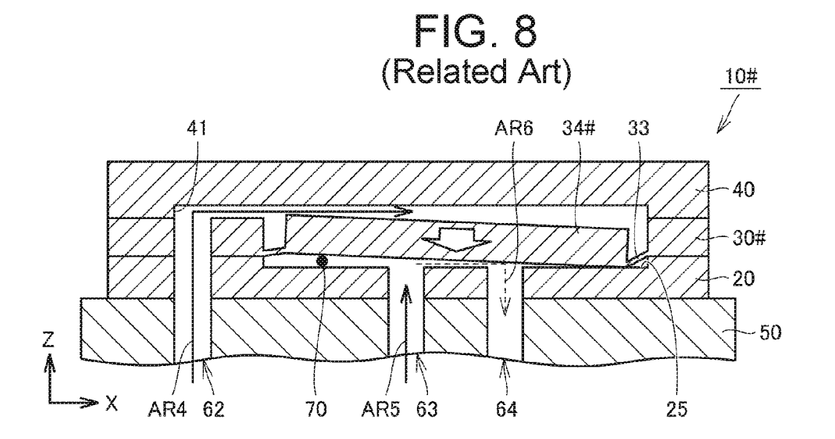
FIG. 8 is a diagram showing a state of the micro-valve of the comparative example when a foreign substance is mixed.

In the micro-valve 10# of this comparative example, it is assumed that a foreign substance 70 is mixed in the space between the diaphragm layer 30# and the base layer 20. As described above, in the micro-valve 10#, although the flow path of the sample gas is blocked by the close contact between the rigid body region 34# and the base layer 20 due to the surface contact, the rigid body region 34# is not elastically deformed within the pneumatic fluid pressure range, or the deformation amount of the elastic deformation is extremely small, and therefore, if a foreign substance 70 is mixed between the rigid body region 34# and the base layer 20, the rigid body region 34# and the base layer 20 cannot come into surface contact with each other, so that a gap may be generated between the rigid body region 34# and the base layer 20 as shown in FIG. 8.

As a result, the sample gas introduced from the inlet port 63 (see the solid line arrow ARS in FIG. 8) leaks to the outlet port 64 through the gap (see the broken line arrow AR6 in FIG. 8), so that the sealing performance of the micro-valve is lost.

Figure 9:
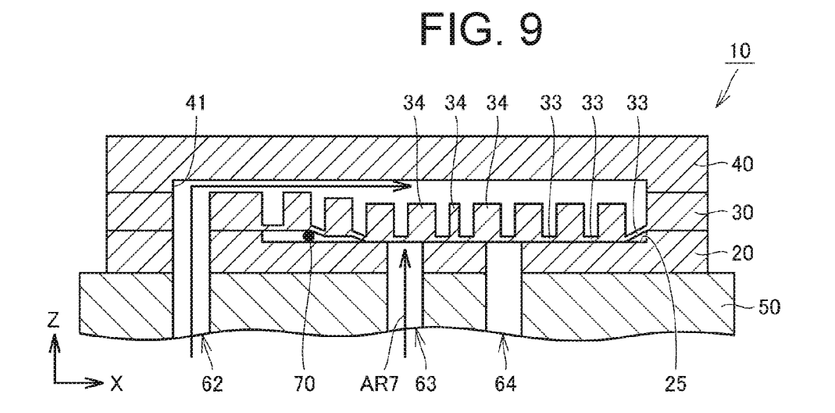
FIG. 9 is a diagram showing a state of the micro-valve according to an embodiment of the present invention when a foreign substance is mixed.

On the other hand, in the micro-valve 10 according to an embodiment of the present invention, since the plurality of annular recesses 31 forming the deformation regions 33 is formed concentrically, even when a foreign substance 70 is mixed in the space between the diaphragm layer 30 and the base layer 20, as shown in FIG. 9, the flexibility of the moving portion as a whole is increased by the plurality of deformation regions 33 having flexibility, and the diaphragm layer 30 and the base layer 20 can be brought into surface contact with each other in portions other than the periphery of the foreign substance 70. As a result, at least one of the inlet port 63 and the outlet port 64 can be closed, so that the leakage of the sample gas to the outlet port 64 can be prevented. Therefore, in the micro-valve 10 according to an embodiment of the present invention, the sealing performance when a foreign substance is mixed can be improved as compared with the comparative example.

Figure 10:
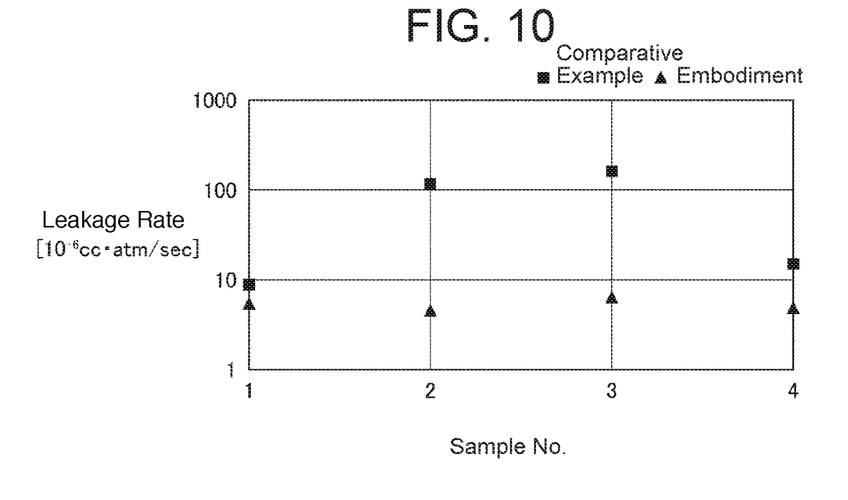
FIG. 10 is a diagram for explaining leakage rates in micro-valves in the micro-valve of the comparative example and the micro-valve of the embodiment of the present invention.

FIG. 10 is a diagram for explaining the results of experimental measurements of the leakage rates for a sample gas in the micro-valve 10 of the comparative example 10# and that of the embodiment of the present invention. In FIG. 10, the horizontal axis represents the number of samples of the measured micro-valves, and the vertical axis represents the logarithm of the leakage rate. The leakage rate is expressed as a leakage amount per unit time at unit pressure, meaning that the sealing performance decreases as the leakage rate increases. Note that in FIG. 10, the square symbol indicates the results of the micro-valve 10# of the comparative example, and the triangle symbol indicates the results of the micro-valve 10 of the embodiment of the present invention.

As shown in FIG. 10, in the micro-valve 10 of the embodiment of the present invention, the stable leakage rate of about 4 to $7 \times 10^{-6}$ [cc·atm/sec] is realized in any samples. On the other hand, in the micro-valve 10# of the comparative example, the leakage rate is 10 to $200 \times 10^{-6}$ [cc·atm/sec] which is higher than that of the micro-valve 10 of the embodiment of the present invention, and the variability in each sample is also large.

Although the experiment of FIG. 10 did not intentionally mix a foreign substance into a sample gas, it can be understood from the experiment results that the micro-valve 10 of the embodiment of the present invention is less susceptible to a foreign substance contained in a sample gas as compared with the comparative example.

Further, in the micro-valve 10# of the comparative example, since the dimension of the rigid body region 34# with respect to the particle diameter of the foreign substance 70 is large, the stress concentrates only in the part of the rigid body region 34# contacting the foreign substance 70 when the foreign substance 70 is sandwiched between the bottom 25 of the base layer 20 and the rigid body region 34# as shown in FIG. 8. On the other hand, in the micro-valve 10 of the embodiment of the present invention, since the dimension of one rigid body region 34 is smaller than that of the comparative example and the deformation region 33 is formed between rigid body regions 34, a part of the force applied by the foreign substance 70 is utilized for the elastic deformation of the deformation regions 33. Therefore, in the micro-valve 10 of the embodiment of the present invention, the stress applied to the rigid body region 34 can be reduced.

Although not shown in the drawings, the state of the stress concentration when the upper and lower differential pressure of the diaphragm layer was set to 200 kPa was simulated. Aa result, the von Mises stress at the contact point of the foreign substance 70 was about 800 MPa for the micro-valve 10# of the comparative example, and about 600 MPa for the micro-valve 10 of the embodiment of the present invention.

As described above, in the micro-valve having a laminate structure, the sealing performance when a foreign substance is mixed can be improved by applying a configuration in which a plurality of deformation regions and a plurality of rigid body regions are alternately arranged in a diaphragm layer for switching between flowing and blocking of a sample gas. In addition, with the above-described structure, a stress applied to the diaphragm layer when a foreign substance is mixed can be reduced, so that the breakage of the micro-valve can be prevented and the service life can be extended.

MODIFICATION

First Modification

In the above-described embodiment, the description is directed to a diaphragm layer in which a plurality of deformation regions and a plurality of rigid body regions are alternately arranged, but the present invention is not limited to the above-described configuration as long as the flexibility of the diaphragm layer can be improved.

Figure 11:
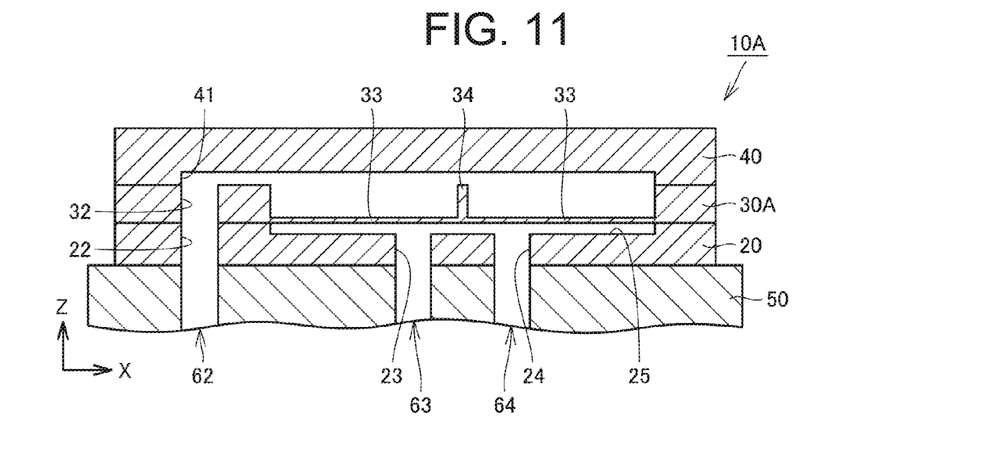
FIG. 11 is a side surface perspective view of a micro-valve according to a first modification of the present invention.

FIG. 11 is a side perspective view of a micro-valve 10A of a first modification. The most portion of the diaphragm layer 30A of the micro-valve 10A is formed of a thin-film deformation region 33, and a rigid body region 34 is formed only in the vicinity of the central portion of the deformation region 33. In the micro-valve 10A, when the diaphragm layer 30A is viewed from above, the portions overlapping with the inlet port 63 and the outlet port 64 are covered with a deformation region 33.

Since the diaphragm layer 30A of the micro-valve 10A is largely formed of the deformation region 33, when a foreign substance is mixed, elastic deformation occurs around the foreign substance, so that the portions of the inlet port 63 and the outlet port 64 are closed by being covered with the deformation region 33. This ensures the sealing performance.

When the entire diaphragm layer 30A is formed as a thin-film deformation region 33, for example, when a pneumatic fluid is stopped and the micro-valve is turned in an open state, the deformation amount of the deformation region 33 becomes excessive, which may lead to the breakage of the deformation region 33. Therefore, as shown in FIG. 11, by forming a rigid body region 34 to partially limit the deformation amount of the deformation region 33, it is possible to suppress the breakage of the deformation region 33. Note that the rigid body region 34 is not limited to being formed at only one place as shown in FIG. 11, and may be formed at a plurality of places.

Second Modification

Figure 12:
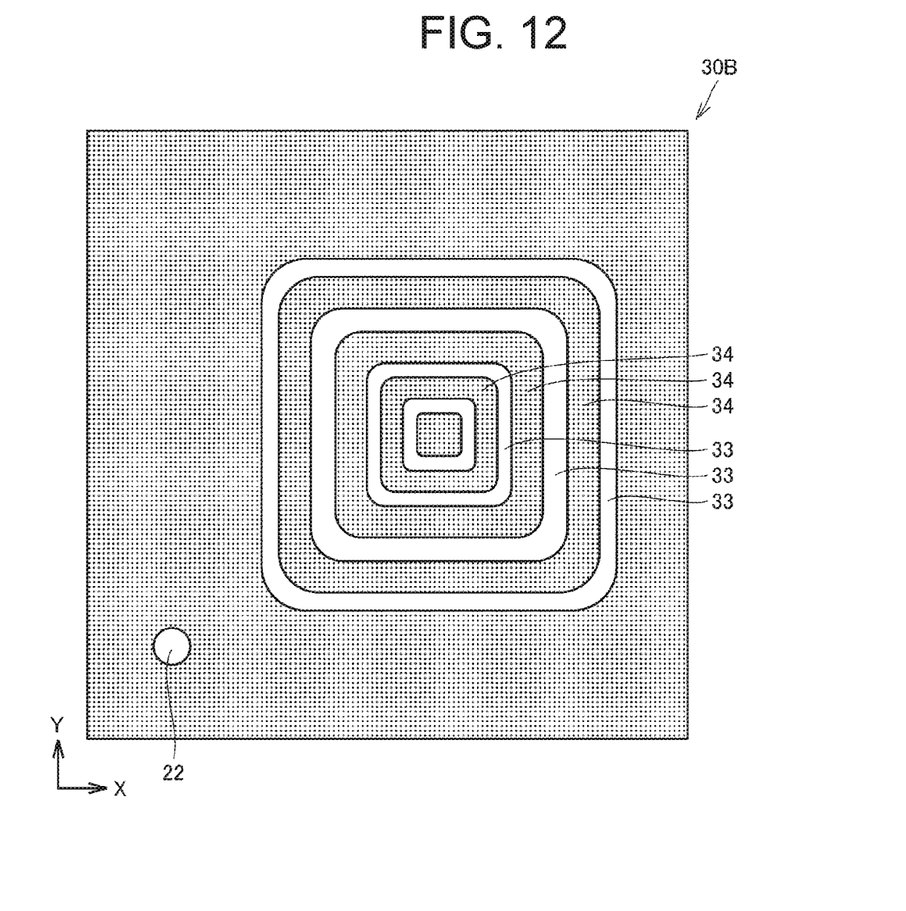
FIG. 12 is a plan view of a diaphragm layer of a micro-valve of a second modification.

In the above-described embodiment, the description is directed to the case in which the deformation region and the rigid body region of the diaphragm layer have a circular shape when viewed from above, but the deformation region and the rigid body region do not necessarily have a circular shape. For example, like in the diaphragm layer 30B of the second modification shown in FIG. 12, the outer shape of the deformation region 33 and the rigid body region 34 may be a quadrilateral. Although not shown, the outer shape of the deformation region 33 and the rigid body region 34 may be formed in an elliptical shape or a polygonal shape having a quadrilateral shape or more. From the viewpoint of suppressing the breakage of the diaphragm layer, it is more preferable that the outer shape is formed in a circular shape in which the modification of the deformation region in a plane becomes uniform and the partial stress concentration can be suppressed.

[Aspects]

It will be understood by those skilled in the art that the plurality of exemplary embodiments described above is illustrative of the following aspects.

(Item 1)

A micro-valve according to one aspect of the present invention relates to a micro-valve having a laminate structure. The micro-valve includes a base layer formed with an inlet port for introducing a gas into the micro-valve and an outlet port for allowing the gas introduced from the inlet port to flow outside, and a diaphragm layer arranged to face the base layer and configured to switch between flowing and blocking of the gas from the inlet port to the outlet port by elastic deformation of the diaphragm layer. The diaphragm layer has a configuration in which a plurality of deformation regions and a plurality of rigid body regions are alternately arranged, the deformation region being elastically deformable in accordance with an inflow of a pneumatic fluid into the micro-valve. The diaphragm layer is configured to close at least one of the inlet port and the outlet port by elastic deformation of at least a part of the plurality of deformation regions.

According to the micro-valve as recited in the above-described Item 1, the micro-valve has a diaphragm layer formed of a plurality of deformation regions and a plurality of rigid body regions, a plurality of deformation regions deforms in accordance with the inflow of a pneumatic fluid, so that at least one of the inlet port and the outlet port is closed. Since the diaphragm layer has a plurality of deformation regions, the flexibility of the diaphragm layer is increased. Therefore, even in cases where a foreign substance is mixed into the sealing surface, at least one of the inlet port and the outlet port can be reliably closed. Therefore, in the micro-valve, it is possible to improve the sealing performance when a foreign substance is mixed.

(Item 2)

In the micro-valve as recited in the above-described Item 1, the diaphragm layer is formed of a single material, and a thickness of the plurality of deformation regions in a lamination direction is smaller than a thickness of the plurality of rigid body regions in the lamination direction.

According to the micro-valve as recited in the above-described Item 2, since the thickness of the deformation region in the lamination direction is smaller than the thickness of the rigid body region in the lamination direction, it is possible to cause the deformation region to be elastically deformed when a pneumatic fluid flows. Also, since the diaphragm layer is formed of a single material, the bonding strength of the interface between the elastic region and the rigid body region can be increased, as compared with the case in which the elastic region and the rigid body region are formed from different materials.

(Item 3)

In the micro-valve as recited in the above-described Item 1 or 2, in a plan view of the diaphragm layer viewed in a lamination direction, a part of the plurality of rigid body regions and the plurality of deformation regions each have an annular shape, and the plurality of deformation regions and the plurality of rigid body regions are alternately arranged concentrically.

According to the micro-valve as recited in the above-described Item 3, since the plurality of deformation regions and the plurality of rigid body regions are both formed in an annular shape concentrically, in the elastic deformation of the deformation region, the deformation in a plane becomes uniform and the stress can be suppressed from being partially concentrated. Therefore, the breakage of the diaphragm layer can be suppressed.

(Item 4)

In the micro-valve as recited in any one of Items 1 to 3, the micro-valve further includes a cover layer. The diaphragm layer is arranged between the cover layer and the base layer.

According to the micro-valve as recited in the above-described Item 4, the micro-valve is formed of a laminate structure having a cover layer, a diaphragm layer, and a base layer. As a result, the introduction path for a pneumatic fluid for deforming the diaphragm layer can be formed.

(Item 5)

In the micro-valve as recited in the above-described Item 4, the pneumatic fluid flows into between the diaphragm layer and the cover layer, and the diaphragm layer is pressed against the base layer to close at least one of the inlet port and the outlet port.

According to the micro-valve described in the above-described Item 5, since the cover layer is arranged on the upper portion of the diaphragm layer, a pneumatic fluid can be supplied between the diaphragm layer and the cover layer to deform the diaphragm layer. As a result, the diaphragm layer and the base layer are brought into close contact with each other, so that the fluid can be blocked.

(Item 6)

In the micro-valve as recited in any one of the above-described Items 1 to 5, the diaphragm layer is formed using silicon, glass, or PEEK (Poly Ether Ether Ketone) resin.

According to the micro-valve described in the above-described Item 6, since the diaphragm layer is formed using silicon, glass, or PEEK resin, desired flexibility and intensity can be achieved.

(Item 7)

A micro-valve according to another aspect of the present invention relates to a micro-valve having a laminate structure. The micro-valve includes a base layer formed with an inlet port for introducing a gas into the micro-valve and an outlet port for allowing the gas introduced from the inlet port to flow outside, and a diaphragm layer arranged to face the base layer and configured to switch between flowing and blocking of the gas from the inlet port to the outlet port by elastic deformation of the diaphragm layer. The diaphragm layer includes a deformation region configured to be elastically deformed as a pneumatic fluid flows into the micro-valve and a rigid body region that limits a deformation amount of the deformation region. At least one of the inlet port and the outlet port is closed by being covered by the elastically deformed deformation region.

According to the micro-valve as recited in the above-described Item 7, the micro-valve includes a diaphragm layer formed of a deformation region and a rigid body region which restricts the deformation amount of the deformation region, and at least one of the inlet port and the outlet port is closed when the deformation region is deformed in accordance with the inflow of a pneumatic fluid. Since the the diaphragm layer has the deformation region, the flexibility of diaphragm layer is increased. Therefore, even when a foreign substance is mixed into the sealing surface, at least one of the inlet port and the outlet port can be reliably closed. Therefore, in the micro-valve, it is possible to improve the sealing performance when a foreign substance is mixed. Furthermore, since the deformation amount of the deformation region is limited by the rigid body region, it is possible to suppress the breakage due to excessive deformation of the deformation region.

It should be noted that the embodiments disclosed herein be considered in all respects as illustrative and not restrictive. The scope of the present disclosure is indicated by the appended claims rather than by the foregoing description of embodiments, and it is intended that the scope of the present disclosure includes all modifications within the meanings and ranges equivalent to the scope of the appended claims.

DESCRIPTION OF SYMBOLS 10, 10A: Micro-valve,
20: Base layer
21, 31, 41: Recess
22 to 24, 32, 52 to 54: Opening
25: Bottom
26, 36: Outer edge portion
30, 30A, 30B: Diaphragm layer
33: Deformation region
34: Rigid body region
40: Cover layer
50: Flow path member
62: Supply port
63: Inlet port
64: Outlet port
70: Foreign substance

The invention claimed is:

1. A micro-valve having a laminate structure, comprising:
a base layer having an upper surface, an inlet port for introducing a gas into the micro-valve, and an outlet port for allowing the gas introduced from the inlet port to flow outside, the upper surface having openings corresponding to the inlet and outlet ports, respectively; and
a diaphragm layer arranged to face the base layer and configured to elastically deform to switch between flowing and blocking of the gas from the inlet port to the outlet port
wherein the diaphragm layer has a sealing surface, deformation regions, and rigid body regions, the deformation regions and rigid body regions being arranged next to one another on a side of the diaphragm layer opposite to the sealing surface, the deformation regions each being elastically deformable in accordance with an inflow of a pneumatic fluid into the micro-valve, and
wherein the diaphragm layer is configured to partly or wholly deform in its deformation regions, causing the sealing surface to abut against the upper surface of the base layer, which closes the inlet port and/or the outlet port.

2. The micro-valve as recited in claim 1,
wherein the diaphragm layer is formed of a single material, and a thickness of the deformation regions in a lamination direction is smaller than a thickness of the rigid body regions in the lamination direction.

3. The micro-valve as recited in claim 1,
wherein in a plan view of the diaphragm layer viewed in a lamination direction, a part of the rigid body regions and the deformation regions each have an annular shape, and the deformation regions and the rigid body regions are alternately formed concentrically.

4. The micro-valve as recited in claim 1, further comprising:
a cover layer,
wherein the diaphragm layer is arranged between the cover layer and the base layer.

5. The micro-valve as recited in claim 4,
wherein the pneumatic fluid flows into between the diaphragm layer and the cover layer, and the diaphragm layer is pressed against the base layer to close at least one of the inlet port and the outlet port.

6. The micro-valve as recited in claim 1,
wherein the diaphragm layer is formed using silicon, glass, or PEEK (Poly Ether Ether Ketone) resin.

7. A micro-valve having a laminate structure, comprising:
a base layer having an upper surface, an inlet port for introducing a gas into the micro-valve, and an outlet port for allowing the gas introduced from the inlet port to flow outside, the upper surface having openings corresponding to the inlet and outlet ports, respectively; and
a diaphragm layer arranged to face the base layer and configured to elastically deform to switch between flowing and blocking of the gas from the inlet port to the outlet port,
wherein the diaphragm layer includes a sealing surface, a deformation region, and a rigid body region, the deformation region and the rigid body region being arranged on a side of the diaphragm layer opposite to the sealing surface, the deformation region being configured to be elastically deformed as a pneumatic fluid flows into the micro-valve, and the rigid body region being configured to limit a deformation amount of the deformation region, and
wherein at least one of the inlet port and the outlet port is configured to be closed by causing the sealing surface of the elastically deformed deformation region to abut against the upper surface of the base layer.

8. The micro-valve according to claim 1,
wherein the base layer has a supply port for introducing the pneumatic fluid into the micro-valve.

9. The micro-valve according to claim 7,
wherein the base layer has a supply port for introducing the pneumatic fluid into the micro-valve.

10. A micro-valve having a laminate structure, comprising:
a base layer having an upper surface, an inlet port for introducing a gas into the micro-valve, and an outlet port for allowing the gas introduced from the inlet port to flow outside, the upper surface having openings corresponding to the inlet and outlet ports, respectively; and
a diaphragm layer arranged to face the base layer and configured to elastically deform to switch between flowing and blocking of the gas from the inlet port to the outlet port,
wherein the diaphragm layer has a sealing surface, deformation regions, and rigid body regions, the deformation regions and rigid body regions being alternately and concentrically arranged on a side of the diaphragm layer opposite to the sealing surface, the deformation regions each being elastically deformable in accordance with an inflow of a pneumatic fluid into the micro-valve.

* * * * *